(12) United States Patent
Samuels

(10) Patent No.: US 8,827,713 B2
(45) Date of Patent: Sep. 9, 2014

(54) SYSTEM AND METHODS FOR A READING FLUENCY MEASURE

(71) Applicant: Jay Samuels, Saint Paul, MN (US)

(72) Inventor: Jay Samuels, Saint Paul, MN (US)

(73) Assignee: University of Minnesota, Saint Paul, MN (US)

( * ) Notice: Subject to any disclaimer, the term of this patent is extended or adjusted under 35 U.S.C. 154(b) by 0 days.

(21) Appl. No.: 13/778,768

(22) Filed: Feb. 27, 2013

(65) Prior Publication Data

US 2013/0177880 A1   Jul. 11, 2013

Related U.S. Application Data

(63) Continuation of application No. 11/820,187, filed on Jun. 18, 2007, now abandoned.

(51) Int. Cl.
*G09B 17/00* (2006.01)

(52) U.S. Cl.
USPC .............................. 434/178; 434/156; 434/167

(58) Field of Classification Search
CPC ............ G09B 19/00; G09B 7/00; G09B 7/06; G09B 17/00; G09B 17/003; G09B 17/006
USPC ........................... 434/322, 323, 156, 157, 167
See application file for complete search history.

(56) References Cited

U.S. PATENT DOCUMENTS

| | | | |
|---|---|---|---|
| 3,748,754 | A | 7/1973 | LaBerge |
| 4,245,405 | A | 1/1981 | Lien et al. |
| 5,899,698 | A | 5/1999 | Sandlin |
| 6,053,739 | A | 4/2000 | Stewart et al. |
| 6,155,834 | A | 12/2000 | New, III |
| 7,527,498 | B2 | 5/2009 | Matsoff |
| 2002/0150868 | A1 | 10/2002 | Yui et al. |
| 2002/0156632 | A1 | 10/2002 | Haynes et al. |
| 2004/0049391 | A1 | 3/2004 | Polanyi et al. |
| 2004/0243418 | A1 | 12/2004 | Wen et al. |
| 2005/0106540 | A1 | 5/2005 | Wasowicz et al. |
| 2006/0008781 | A1 | 1/2006 | Townshend et al. |
| 2006/0063139 | A1 | 3/2006 | Carver et al. |
| 2006/0069562 | A1 | 3/2006 | Adams et al. |
| 2006/0194181 | A1 | 8/2006 | Rosenberg |
| 2007/0077543 | A1 | 4/2007 | Hartness et al. |
| 2007/0112554 | A1 | 5/2007 | Goradia |
| 2007/0248938 | A1 | 10/2007 | Ronald |
| 2008/0187892 | A1 | 8/2008 | Lancaster |

*Primary Examiner* — Bruk Gebremichael
(74) *Attorney, Agent, or Firm* — Valauskas Corder LLC

(57) ABSTRACT

The present invention measures reading fluency, which is simultaneous decoding and comprehension. Whether or not a person is a fluent reader is determined by the size of the visual unit, or sting of letters, used in word recognition. In order to measure the size of the visual unit used in word recognition, a lexical decision task ("LDT") is used in which short and long words are presented on a display device. The person determines if the string of letters formulates a word. The person enters their response on an input device and the results are recorded. A score is calculated that measures reading fluency. The ability to correctly identify a string of letters as a word using holistic processing, rather than letter-by-letter, is the hallmark of a fluent person.

9 Claims, 3 Drawing Sheets

SYSTEM AND METHODS FOR A READING FLUENCY MEASURE

CROSS-REFERENCE TO RELATED APPLICATIONS

This application claims priority to U.S. patent application Ser. No. 11/820,187 filed Jun. 18, 2007, which is incorporated by reference herein in its entirety.

FIELD OF THE INVENTION

The present invention generally relates to fluency and more particularly to measuring reading fluency.

BACKGROUND OF THE INVENTION

In 1997, Congress commissioned the National Reading Panel. This panel of experts assessed the status of research-based knowledge, including the effectiveness of various approaches to teaching children to read. The panel selected fluency as one of the five reading areas for review and analysis because there is growing concern that children are not achieving fluency in reading. It has been recognized that fluency is one of the most neglected areas in the reading curriculum. The National Reading Panel Report (2000) noted that often teachers do not recognize that word recognition accuracy is not the end point of reading instruction. Fluency represents a level of expertise beyond word recognition accuracy or the speed at which a person can read orally. A fluent reader is one who can perform multiple tasks, such as word recognition and comprehension at the same time. Some indicators of reading fluency are accuracy and ease in decoding, speed of reading, and expression in oral reading. However, these are mere indicators of fluency. The essential characteristics of fluency are simultaneous decoding and comprehension of the text.

Being a fluent or automatic reader is not a stage of development in which all words can be processed quickly and easily. Even highly skilled readers may encounter uncommon, low frequency words that they cannot recognize automatically. In such situations, the reader encountering unfamiliar, low-frequency words may shift from automatic to a controlled processing mode. At one time, fluency was considered to be a dichotomous variable in which readers were considered to be either "fluent" or "non-fluent". Today, however, fluency is considered to be a continuum. For example, a reader may be fluent at the third grade instructional level, but non-fluent at the fifth grade instructional level.

Reading fluency requires that two tasks, decoding and comprehension, be accomplished simultaneously. As a result, a proper test of fluency must test both decoding and comprehension simultaneously. One of the primary measures being used today for monitoring student progress is the formative assessment procedure called Curriculum Based Measurement ("CBM"). CBM was originally used to allow teachers to monitor the reading progress of students by measuring the student's reading speed week by week. It requires students to orally read a passage appropriate for their grade level. The number of words read correctly in one minute is recorded. The CBM testing procedure was never intended to be a test of reading fluency, but became the prototype for another test, the DIBELS test.

Dynamic Indicators of Basic Early Literacy Skills ("DIBELS") is an early age literacy assessment typically used for the kindergarten through sixth grade levels. The DIBELS test is based on the one minute testing procedure used in Curriculum Based Measurement. It uses brief, timed measures to track the progress of a student over time. More specifically, the DIBELS assessment employs a sequence of one-minute measures that test, for example, recognizing initial sounds, naming the letters of the alphabet, segmenting the phonemes in a word, reading nonsense words, oral reading of a passage, retelling, and word use. The DIBELS test can answer the question whether a student is at risk of reading difficulty, but like CBM cannot conclusively establish that a participant is fluent or non-fluent. The DIBELS test has been criticized as a test of fluency since it does not measure comprehension. Students who take the DIBELS test quickly learn that comprehension will not be assessed and that only speed counts. These students may come to think that the important aspect to reading is speed and that comprehension is of little importance.

The Retell Fluency ("RTF") is intended to provide a comprehension check for the DIBELS test. A student is asked to tell as much as they can in one minute about the text previously read. The combination of the DIBELS test and the RTF test is considered unreliable since decoding and comprehension are not tested simultaneously. Studies have been conducted in which students were given a test of oral reading in which their oral reading speed was recorded. Subsequent to this test, a comprehension test was administered. Although the correlations between these two measures of reading speed and comprehension were significant, the two measures failed to measure simultaneous decoding and comprehension. When students were tested in a manner that required them to decode and comprehend text simultaneously, the correlations between these two measures of reading speed and comprehension were not significant. This may be attributed to the fact that students orally read text and then are immediately tested on comprehension such that students typically read the text orally at a slow pace in order to understand the material. Thus, the DIBELS test as well as the RTF test are invalid measures of fluency.

The Woodcock Johnson Word Recognition test is another reading test in use today. It requires that participants read words in order from easy to difficult. A grade equivalent is assigned based on where the participant begins having difficulty reading from the list of words. Here again comprehension is not part of the measure.

Reading Fluency Indicator ("RFI") is a better measure of reading fluency. It requires a participant to read a passage from the participant's grade level. The passage is taken away and the participant is asked to answer a four question multiple-choice test. This test comes closer to measuring the main characteristic of fluency, that is, simultaneous decoding and comprehending. However, RFI can not answer the question whether a participant is fluent or not. RFI testing is also fairly time-consuming.

Accordingly, there is a need for a valid system and methods by which reading fluency can be measured accurately and reliably requiring simultaneous decoding and comprehension. The present invention satisfies this demand.

SUMMARY OF THE INVENTION

The present invention is a system and methods by which reading fluency of almost any language can be measured, both alphabetically based and non-alphabetically based writing systems. The present invention mimics fluent reading, which requires simultaneous decoding and comprehension. The present invention measures the size of the visual unit used in word recognition. For example, beginning readers and skilled readers that are given the same words to recognize, perform the word recognition task differently. The beginning reader uses letter-by-letter processing while the college student recognizes the same words holistically. In order to measure the size of the visual unit used in word recognition, a lexical decision task ("LOT") is used in which short and long words are presented.

According to one embodiment of the present invention, a computer presents a string of letters, or letter string, on a computer screen. The student must decide if the letter string is a word with meaning (real word) or that the string of letters has no meaning (non-word). If the letter string is a real word, the student presses the "yes" button on an input device. If the letter string is a non-word, the student presses the "no" button on an input device. The input device measures accuracy of the response and latency of the response. The letter strings that are presented are short three letter words or longer six letter words, although it is contemplated that other embodiments of the present invention may include letter strings less than three letter words and greater than six letter words. If the student taking the test processes the word letter-by-letter, then the latency response for the long words takes more time than for the short words. If the student taking the test processes the word holistically, then the latency response for the long words is approximately the same for the short words. The size of the visual unit used in word recognition is measured. Less skilled readers recognize visual units that are smaller than the entire word, whereas skilled readers recognize visual units as the entire word.

The size of the unit used in word recognition can be as small as a single letter of the letter string or as large as an entire word. Research has consistently shown that the size of the unit of word recognition correlates with the fluency of a participant. For purposes of this application, a participant is any person who is the subject of the fluency testing, also referred to herein as a person, student or reader.

The present invention is based on the automaticity theory. The automaticity theory employs the concept that there is a limit to how much information the mind can process at any one time. For example, if readers are using all of their processing capacity to decode the words printed in text, they will not be able to comprehend at the same time. After extended periods of practice, the decoding task becomes automatic, meaning that only a small portion of their processing capacity is used for the decoding and there is enough capacity in reserve to comprehend the text at the same time. Thus, skilled readers can decode and comprehend text simultaneously. According to automaticity theory, a behavior or skill is automatic when two or more complex activities can be done at the same time following a long period of training, whereas before training only one of these skills could be done at a time.

The two critical tasks in reading are decoding and comprehension. The main characteristic of reading fluency is "simultaneous decoding and comprehension" of text. When decoding is automatic, there is sufficient cognitive capacity available so that comprehension can be completed simultaneously. Along with the growth in automaticity, as participants progress from beginning to fluent reading stages there are changes in the size of the units they use in word recognition progressing from letter, to clusters, to whole words.

Reading fluency is the ability to read text accurately, quickly, and with understanding. Fluency bridges word decoding and comprehension simultaneously. Decoding is the process of transforming text into language. Comprehension is a measure of whether the text that the participant has read is understood by the participant. A participant is fluent if the participant can simultaneously decode and comprehend text.

According to the present invention, the lexical decision task provides information on whether or not a participant can recognize a string of letters as a word. The determination is based on reading words letter-by-letter, as letter clusters, or as holistic units. The versatility of the LDT is rather broad since it can be used with high frequency common words as well as the low frequency uncommon words.

The LDT Reading Fluency test, according to the present invention, measures the size of the visual unit used in word recognition. The LDT Reading Fluency test concludes that the size of the visual unit used in word recognition can be used as the measure of reading fluency.

The LDT Reading Fluency test can be used with the specialized vocabulary found in a variety of disciplines such as medicine, law, and education. In each case, the size of the unit of word recognition is measured.

According to the present invention, a string of letters is presented to a participant on a display device, including but not limited to a computer screen or television screen. The string of letters, for example, is three, four, five or six letters long.

Prior to the participant being shown the string of letters, the participant is provided with instructions about the test. The instructions may be simple. For example, the instructions may state: "You will see letters on the screen. If the string of letters is a real word, press the "Yes" button. If the string of letters is not a real word, press the "No" button". The string of letters is presented randomly from a database of a collection of words and non-words, although the string of letters may be presented sequentially from a database. The database includes high frequency and low frequency words. The string of letters range from three to six letters, but any number of letters in the string is contemplated such as longer words. The database can further include words and non-words categorized by grade level or age of the participant. Grade level is educational level including college and intermediate grades, such as 2, 4, and 6. Categorizing the database by grade level or age of the participant allows fluency to be assessed with greater accuracy. For example, a participant may be fluent on texts that have a third grade readability level but not be fluent on texts that have a sixth grade readability level.

It is also contemplated an embodiment of the present invention includes a training step. The participant learns how the LDT Reading Fluency test is administered. In order to insure that the participant taking the test understands the instructions, the training step is offered with training words that are similar to what they will see on the test proper. The training step can be used with participants of all grade levels.

The participant determines whether or not the string of letters formulates a word. It is further contemplated that the participant can determine whether or not the string of letters formulates a sentence. The participant enters their response on an input device, such as a computer. It is contemplated that the input device is capable of recording rapid responses. For example, different buttons on a keyboard labeled "yes" for determining the string of letters formulates a word, and "no" for determining the string of letters does not formulate a word, i.e., non-word.

The results are recorded. The results include latency and accuracy of the response. Strings of letters are presented and results are recorded until a score can be calculated. Reading fluency can be measured by comparing the latency responses for scores based on strings of letters between 3 and 6 letter words.

If the scores illustrate that short three letter words are processed faster than the longer six letter words, one concludes that the participant is performing letter-by-letter processing, or recognizing small visual units. Research has shown that beginning readers perform letter-by-letter processing. If, on the other hand, there is essentially no difference in processing time for short and long words, it is concluded that the participant is "chunking" the words and recognizing them as holistic units, or recognizing large visual units. In other words, a short three letter word may be chunked and so too may a six letter word. For the skilled fluent reader, the size of the visual unit of word recognition for the high frequency common words is the entire word, regardless of whether it is a short or a long word. If a participant's processing time for the short and long words is the same, it can be concluded the participant is a fluent reader. In fact, there is a significant correlation between chunking the letter string in the LDT Reading Fluency test and their scores on criterion measures such as the Woodcock Johnson Word Recognition test and the comprehension scores on the ten question Reading Fluency Indicator, which strongly indicates that highly skilled readers are recognizing words as holistic units, or "chunks".

The present invention illustrates correlations between the size of the visual unit recognized according to the LDT Reading Fluency test and criterion measures such as the Woodcock Johnson Word Recognition test, tests of oral reading speed, and the Reading Fluency Indicator.

According to the present invention, if the different letter length words are read at the same time, these participants are fluent. Reading fluency can also be measured by the speed of word recognition on the LDT Reading Fluency test. The score measures reading fluency. The ability to correctly identify a string of letters as a word using holistic processing, rather than letter-by-letter, is the hallmark of a fluent reader. Holistic processing is shown by latency scores for three letter words being the same as six letter words.

According to the present invention, if there is no significant difference between latencies on six letter words and three letter words, the participant is reading three, four, five and six letter length words holistically as large visual units. In this manner, students do not need to exert cognitive capacity to identify the words and the bulk of the cognitive capacity can be directed to comprehension.

An object of the present invention is to provide a system and method that accurately and reliably measures reading fluency.

Another object of the present invention is to measure the size of a visual unit used in word recognition. The LDT Reading Fluency test concludes that the size of the visual unit used in word recognition can be used as the measure of reading fluency.

Another object of the present invention is to determine if a person is a fluent reader by the size of the visual unit used in word recognition. Fluency is determining that a string of letters is a word holistically versus letter-by-letter. The present invention concludes a participant is fluent based on the size, or number of letters, of the visual unit recognized in word recognition.

Another object of the present invention is to provide a system and method to determine whether or not a participant has an impairment, for example, a medical condition such as dyslexia, scotopic sensitivity syndrome, asfedia, or hyperlexia or has been affected by alcohol or drugs.

Another object of the present invention is to provide a system and method that takes less time to administer than prior art systems and methods.

Another object of the present invention is to provide a system and method that does not require an examiner, thereby reducing cost of measuring fluency.

Yet another object of the present invention is to provide a system and method that determines the progression of reading fluency over time.

Another object of the present invention is to utilize a large representative sample of words found in a language including alphabetically based and non-alphabetically based writing systems. An example of an alphabetically based writing system is the English language and an example of a non-alphabetically based writing system is the Chinese language. Chinese words employ different numbers of strokes similar to English words employing different letter lengths. Beginning readers in English recognize words letter-by-letter and skilled readers recognize the same words holistically, similar to beginning readers in Chinese recognize words stroke by stroke and skilled readers recognize the same words holistically.

Another object of the present invention includes determining reading handicaps. For example, there are students in college who have poor reading skills due to a variety of conditions, such as learning disabilities or simply that the student has not practiced reading to the point where decoding can be performed automatically. The LDT Reading Fluency test provides diagnostic data as to the nature of the student's handicap by the size of the visual unit recognized by the student. For example, if a student processes words letter-by-letter, or uses units that are smaller than the whole word, the student has a decoding handicap. If the student processes words holistically, but has difficulty understanding the word, the student has a comprehension handicap. Given the diagnostic data regarding the nature of the handicap, different remediations can be suggested or implemented.

Yet another object of the present invention is to monitor the progress of the student and determine when the student has overcome the handicap. The LDT Reading Fluency test allows a teacher, for example, to test a student over a duration of time to determine when the student stops decoding words letter-by-letter. The present invention provides a point in time when a participant transitions from non-fluent to fluent.

Another object of the present invention is to evaluate teaching techniques, or guide instruction. The LDT Reading Fluency test allows a teacher to evaluate teaching tools for reading, such as flashcards, activities, homework, by testing whether the student reads words as larger visual units after the teaching tool was administered.

Another object of the present invention is to utilize the LDT Reading Fluency test with applications that have criterion measures, such as law and medicine that have tests of knowledge and mastery that can be used as criterion measures.

Another object of the present invention is to utilize the LDT Reading Fluency test for diagnostic data. Graphically depicting the scores for participants at various grade levels illustrates that processing time increases as the grade level of the participant increases. Thus, the processing time of one participant may be compared to other participants at the same grade level, providing diagnostic data.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

The present invention measures reading fluency of any language by a participant. The measurement of the visual unit of word recognition correlates with the fluency of a participant.

Figure 1:
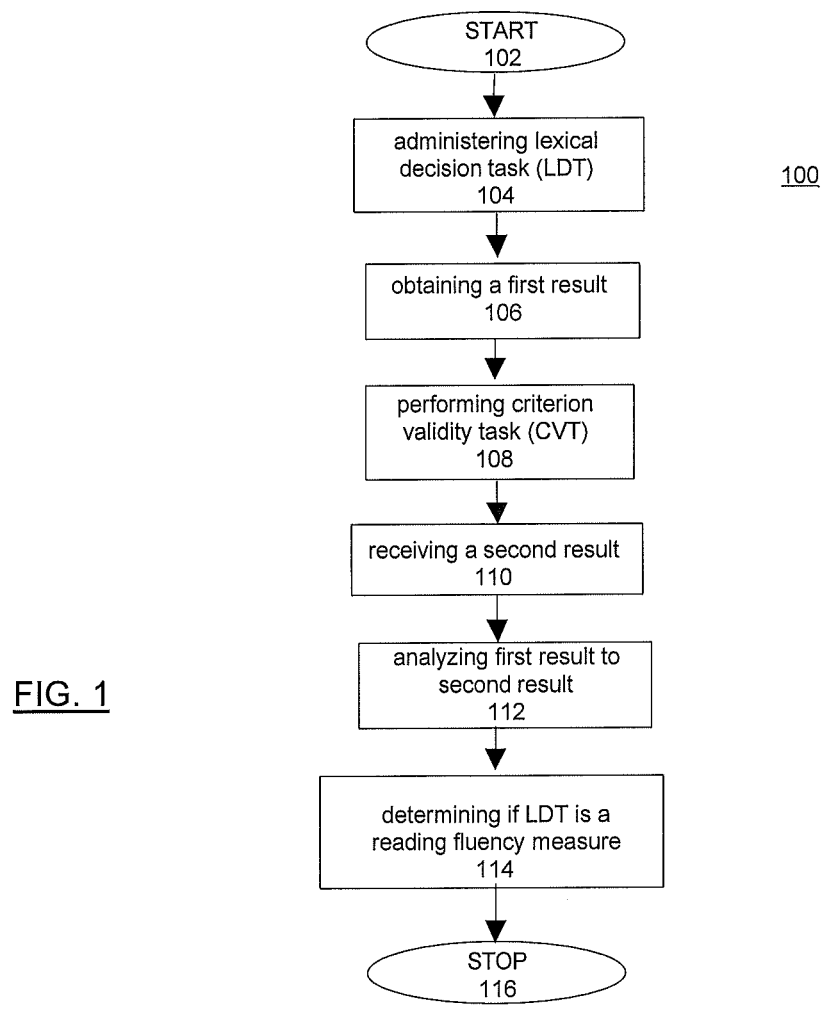
FIG. 1 is a flow chart of the determination of the LDT Reading Fluency test as a reading fluency measure according to the present invention.

In order to determine whether the lexical decision task is a feasible system and methods for measuring reading fluency, the task was correlated with a criterion validity task ("CVT"). FIG. 1 is a flow chart of the determination of the lexical decision task as a reading fluency measure, i.e., LDT Reading Fluency test 100. The present invention begins at step 102 with administering the lexical decision task at step 104. The lexical decision task includes presenting a string of letters, and a participant determines if the sting of letters formulates a word. The string of letters is either randomly or sequentially presented from a database of a collection of words and non-words. The database ranges from high frequency to low frequency words. The LDT Reading Fluency test is described more fully in reference to FIG. 2 below. A first result of the lexical decision task is obtained at step 106. It is contemplated the first result can be a set of results. Step 108 is performing a criterion validity task. Criterion validity tasks are typically more time and labor intensive measures of reading fluency, such as Curriculum Based Measurement ("CBM"), Woodcock Johnson Word Recognition test, tests of oral reading speed, and the Reading Fluency Indicator ("RFI"). Criterion validity is a measure of how well one variable or set of variables predicts an outcome based on information from other variables.

The variables of the lexical decision task include independent variables and dependent variable. The independent variables include, for example, grade level and the variance in the number of letters in a string, i.e., string of letters. Grade level is educational level including college and intermediate grades, such as 2, 4 and 6. The dependent variables include accuracy of a response and the latency of the response. Latency of the response is measured in milliseconds, but any unit of measure is contemplated.

A second result is received from the criterion validity task at step 110. The second result may also be a set of results. The first result of variables of the lexical decision task is analyzed with the second result of variables of the criterion validity task at step 112. With respect to the Woodcock Johnson Word Recognition test, the dependent variable was number of words read correctly. The Reading Fluency Indicator includes dependent variables of speed of reading a passage, words read correctly in one minute, and number of comprehension questions answered correctly. The Curriculum Based Measurement includes a variable of grade level.

Based on this analysis, determining whether the lexical decision task is a feasible reading fluency measure is performed at step 114. Based on studies performed, the lexical decision task is a feasible system and methods as a reading fluency measure, i.e., LDT Reading Fluency test. The size of the visual unit recognized according to the LDT Reading Fluency test correlates with criterion measures such as the Woodcock Johnson Word Recognition test, tests of oral reading speed, and the Reading Fluency Indicator. The LDT Reading Fluency test accurately and reliably substantiates that if a participant can recognize a longer word as quickly as a shorter word, the participant is fluent because the participant is reading the string of letters as holistic units freeing cognitive capacity for comprehension. Conversely, if a participant is reading using letter-by-letter processing, the participant is non-fluent.

The LDT Reading Fluency test measures the size of the visual unit used in word recognition. The LDT Reading Fluency test concludes that the size of the visual unit used in word recognition measures reading fluency.

Figure 2:
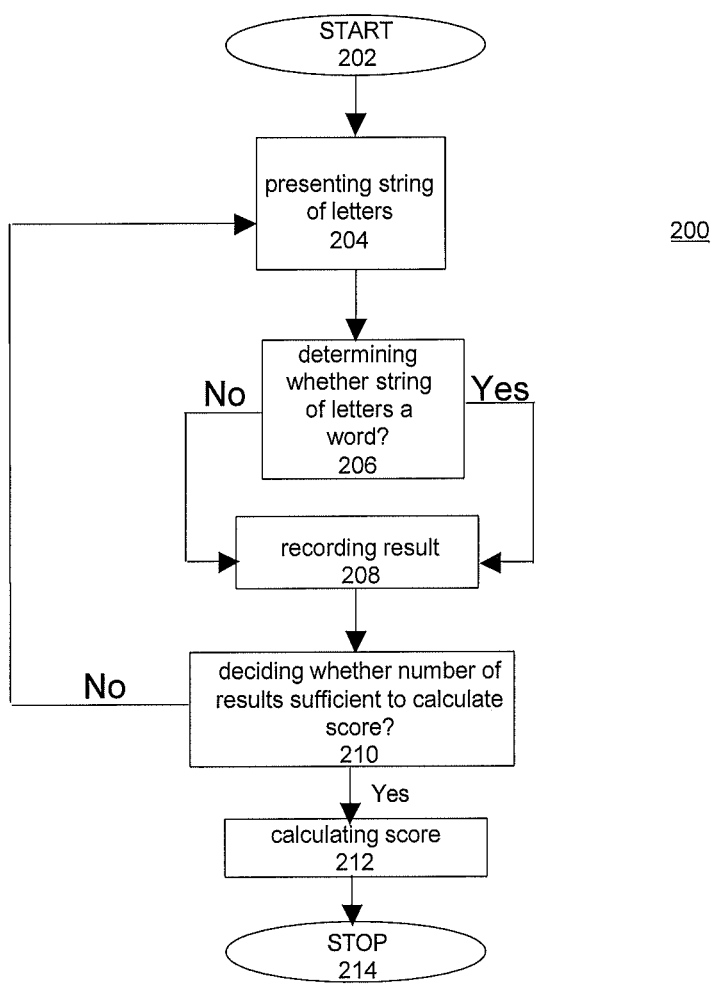
FIG. 2 is a flow chart of the LDT Reading Fluency test according to the present invention.

FIG. 2 is a flow chart of the LDT Reading Fluency test according to the present invention 200. The present invention begins at step 202 with presenting a string of letters at step 204. The string of letters is presented to a participant on a display device, for example a computer screen or television screen. The string of letters is either randomly or sequentially presented from a database of a collection of letter strings of words and non-words. The database includes high frequency and low frequency words. The string of letters range from three to six letters, but any number of letters in the string is contemplated. The database can further include letter strings of words and non-words categorized by grade level or age of the participant.

It is also contemplated an embodiment of the present invention includes a training step. The participant learns how the LDT Reading Fluency test is administered. In order to insure that the participant taking the test understands the instructions, the training step is offered with training words that are similar to what they will see on the test proper. The training step can be used with participants of all grade levels.

At step 204, the participant determines whether or not the string of letters formulates a word by recognizing visual units. It is also contemplated that an embodiment of the present invention includes whether or not the participant determines if the string of letters formulates a sentence. The participant enters their response on an input device, such as a computer. It is contemplated that the input device is capable of recording rapid responses. For example, different buttons on a keyboard labeled "yes" for determining the string of letters formulates a word, and "no" for determining the string of letters does not formulates a word, i.e., non-word.

After the participant makes the determination, results are recorded at step 208. A processor records the results from the response, wherein the results include latency of the response and accuracy of the response. If the recorded results are sufficient at step 210 to calculate a score, the processor calculates a score at step 212. If the recorded results are not sufficient to calculate a score at step 210, a string of letters is presented at step 204, whereupon the steps are repeated until a score is calculated at step 212. The score measures reading fluency by the visual unit of word recognition. The ability to correctly identify a string of letters as a word using holistic processing, rather than letter-by-letter, is the hallmark of the fluent participant. Holistic processing is shown by latency scores for three letter words being the same as six letter words.

A study practicing the present invention showed results that there is a progression from a longer latency between six and three letter words for younger participants (grade 2) to no statistically significant difference for advanced participants (college). The study shows that participants in grades two and four are processing longer high frequency words letter-by-letter and not as holistic units. Participants in grade six are in the development stage, processing letters as chunks. College participants are reading short and long high frequency words as holistic units. This progression in the unit of word recognition as participants advance in reading skills is in agreement with the hypothesis. The no significant difference of latency between six and three letter words for college participants also satisfies the hypothesis in that it is presumed that college participants are reading these words as holistic units. This is confirmed by fluency on criterion validity tasks.

Reading fluency can be measured by comparing the latency responses for scores based on strings of letters between 3 and 6 letter words and conclude that if the different letter length words are read at the same time, these participants are fluent.

Reading fluency can also be measured by the speed of word recognition on the lexical decision task. The study reflected developmental stages as younger participants processed words more slowly than older participants. College participants' mean latency on 3 letter words, 4 letter words, 5 letter words and 6 letter words was fewer than 600 milliseconds. Scores from the LDT Reading Fluency can be graphically depicted for participants at various grade levels illustrating that processing time increases as the grade level of the participant increases. Thus, the processing time of one participant can be compared to other participants at the same grade level, providing diagnostic data. For second, fourth and six graders there was a gradual increase in the time it took to read the longest words, 975, 1197, and 1,731 milliseconds, respectively. The average latency on all the words showed a significant difference between grades for college, sixth, fourth and second graders, 1,217, 937, 829 and 572 milliseconds, respectively. Based on the theories of automaticity and unit of word recognition and the results of this study, it is suggested that participants who can obtain latency scores under 600 milliseconds on a task with high frequency words (the highest latency for college participants) would be considered fluent.

Figure 3:
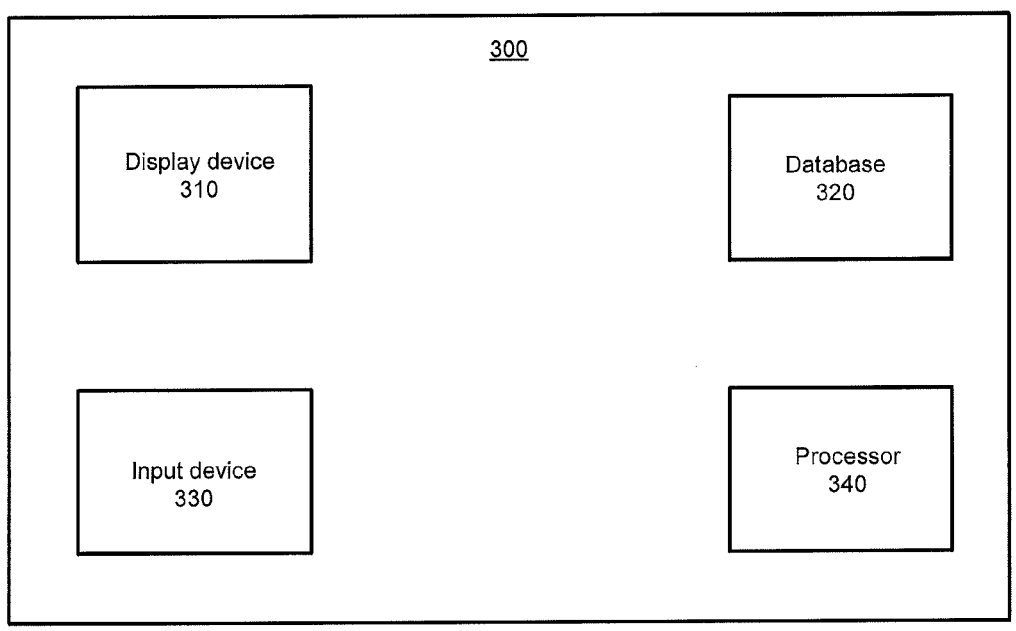
FIG. 3 illustrates an exemplary computer system that may be used to implement the methods according to the present invention.

FIG. 3 illustrates an exemplary computer system 300 that may be used to implement the methods according to the present invention. The computer system 300 includes a display device 310, a database 320, an input device 330 and a processor 340. According to one embodiment of the present invention, the computer 300 presents a string of letters, or letter string, from a database 320 on a display device 310. A participant or user determines whether or not the string of letters presented on the display device 310 formulates a word and enters a response on an input device 330. The computer system 300 receives the response such that a processor 340 records the results from the response. The results include a latency measure and an accuracy measure. The processor 340 then calculates a score to determine reading fluency of the user.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer implemented method for determining reading fluency of a participant, comprising the steps of:
   (a) presenting, on a display device of a computer, to the participant strings of letters from a database, said presenting comprises displaying a string of letters at a time, wherein the database comprises a plurality of strings of letters including words and non-words, the plurality of strings of letters categorized in the database according to an educational level of the participant or an age of the participant;
   (b) receiving, by an input device of the computer, a single button user input corresponding to each of the string of letters displayed, said user input corresponding to the participant evaluation of whether the first string of letters formulates a word or a non-word;
   (c) measuring, by a processor of the computer, a latency measure and an accuracy measure of the single button user input corresponding to each string of letters, wherein the accuracy measure is determined according to the participant identifying the string of letters as a word or a non-word and the latency measure is determined according to the time recorded between the presentation of the string of letters and entry of the single button user input and the latency measure is further determined according to a measure of a size of a visual unit recognized by the participant, the size of the visual unit ranging from all letters of the string of letters or a portion of letters of the string of letters;
   (d) recording, by the processor of the computer, results based on the latency measure and the accuracy measure corresponding to each string of letters;
   (e) repeating, by the processor of the computer, steps (a)-(d) using different strings of letters from the plurality of strings of letters of the database until the results are sufficient to calculate a score, thereby generating latency scores for strings of letters between three and six letter words;
   (f) comparing, by the processor of the computer, the latency scores obtained for correctly identified three letter words and six letter words; and
   (g) determining, by the processor of the computer, the reading fluency of the participant using the result of step (f), wherein the processor determines the participant is non-fluent when the latency scores of the three letter words are not the same as the latency scores of the six letter words, and the processor determines the participant is fluent when the latency scores of the three letter words are the same as the latency scores of the six letter words.

2. The method of claim 1, further comprising the step of administering training on said steps (a)-(g) so that the participant understands the instructions for the method for determining reading fluency of the participant.

3. The method of claim 1, wherein the database includes words of the English language.

4. The method of claim 1, wherein the strings of letters are presented sequentially from the database.

5. The method of claim 1, wherein the strings of letters are presented randomly from the database.

6. The method of claim 1, wherein the database includes high frequency words and low frequency words.

7. The method of claim 1, wherein the strings of letters range from three letters to six letters.

8. An apparatus for administering a lexical decision task to a participant, comprising: a display device, a database, an input device and a processor; said apparatus performing the steps of:
   (a) presenting, on the display device, to the participant strings of letters from the database, said presenting comprises displaying a string of letters at a time, wherein the database comprises a plurality of strings of letters including words and non-words, the plurality of strings of letters categorized in the database according to an educational level of the participant or an age of the participant;
   (b) receiving, by the input device, a single button user input corresponding to each of the string of letters displayed, said user input corresponding to the participant evaluation of whether the string of letters formulates a word or a non-word;

(c) measuring, by the processor, a latency measure and an accuracy measure of the single button user input corresponding to each string of letters, wherein the accuracy measure is determined according to the participant identifying the string of letters as a word or a non-word and the latency measure is determined according to the time recorded between the presentation of the string of letters and entry of the single button user input, and the latency measure is further determined according to a measure of a size of a visual unit recognized by the participant, the size of the visual unit ranging from all letters of the string of letters or a portion of letters of the string of letters;

(d) recording, by the processor, results based on the latency measure and the accuracy measure corresponding to each string of letters;

(e) repeating, by the processor, steps (a)-(d) using different strings of letters from the plurality of strings of letters of the database until the results are sufficient to calculate a score, thereby generating latency scores for strings of letters between three and six letter words;

(f) comparing, by the processor, the latency scores obtained for correctly identified three letter words and six letter words; and (g) determining, by the processor, the reading fluency of the participant using the result of step (f), wherein the processor determines the participant is non-fluent when the latency scores of the three letter words are not the same as the latency scores of the six letter words, and the processor determines the participant is fluent when the latency scores of the three letter words are the same as the latency scores of the six letter words.

9. The apparatus of claim 8, wherein said display device is a computer screen.

* * * * *